United States Patent Office 3,337,364
Patented Aug. 22, 1967

3,337,364
POLYETHYLENE TEREPHTHALATE FILM COATED WITH A SYNTHETIC POLYMERIC RESIN BINDER COMPOSITION CONTAINING AN ADHESION AGENT
Richard J. Whitbourne, Pine Brook, N.J., assignor to Keuffel & Esser Company, Hoboken, N.J., a corporation of New Jersey
No Drawing. Filed July 1, 1963, Ser. No. 292,143
3 Claims. (Cl. 117—138.8)

The present invention relates to subbings for polyester films and refers more particularly to subbings for polyester films to improve the adhesion of subsequent coatings thereto.

Films of polyester such as polyethylene terephthalate are desirable supports for many coatings because of their transparency, stability and toughness. The films however are hydrophobic and relatively inert, and as a result, they are difficult to coat. Adhesive bonds between film and coating are easily broken. To improve adhesion, both physical and chemical means have been tried with little practical success. For example, film has been sandblasted to mechanically abrade the surface and thus provide more surface area for adhesive bonds to form. Adhesion is improved slightly but with high cost and decreased transparency. Chemical treatment with acids or oxidizing agents renders the polyester film more receptive to coating but their effect is reduced by the action of heat and friction encountered during subsequent coating operations.

The present invention overcomes these disadvantages by means of treatments and coatings which improves the adhension of coatings to a polyester film.

One object of the present invention is to provide methods and materials for improving the adhesion of coatings to polyester films.

Another object is to provide a polyester film with a coating which adheres well to said film and to which a second coating adheres well.

Other objects will become apparent during the course of the specification.

Briefly, the invention contemplates the treatment of a polyester film with a mixture which attacks the surface and improves the adhesion of coatings thereto. In the case where a film is already coated, the mixture may be imbibed through the coating to improve adhesion of the coating to the polyester film substrate. The chemical may also be incorporated with polymeric binders to form a subbing which has excellent adhesion to the film and to another coating applied thereto.

Suitable polyester films are polyethylene terephthalate and cellulose acetate butyrate.

Suitable mixtures are trichloroacetic acid, monochloroacetic acid, trifluoroacetic acid, benzyl alcohol or benzophenone with resins such as cellulose acetate (39.8% acetyl), half-second cellulose acetate butyrate, polyvinyl butyral, polyvinyl formal, polyvinyl chloride, poly-(methyl vinyl ether-mono benzyl maleate ester), and acrylic resins.

The mixture is coated on the film by dipping, brushing, spraying, roller-coating, kiss-coating or meniscus coating and dried by heating.

Adhesion was evaluated by a simple tape test. Pressure-sensitive adhesive tape was applied firmly and uniformly to the coating. Then the tape was removed quickly by a sudden upward jerk. Adhesion was rated as excellent when the coating remained on the polyester film.

The following examples further illustrate the present invention and are not intended to restrict the scope of the invention.

Examples (1) The following solution was coated on polyethylene terephthalate film by the dip method and dried for 5 minutes at 100° C.

| | Grams |
|---|---|
| Toluene | 753 |
| Acryloid B–44 (polymer of esters of acrylic and methacrylic acids) 40% solids in toluene | 36 |
| Acryloid AT–50 (thermosetting acrylic polymer) 50% solids in solvent mixture comprising 60% xylene, 22% butanol and 18% methyl Cellosolve | 36 |
| Trichloroacetic acid | 10 |

Adhesion of the coating to the film was excellent.

The concentration of trichloroacetic acid may be varied from 0.4% to 20% with the preferred range being 4% to 9%. The Acryloid B–44 may be varied from 0.02% to 10% with the preferred range being 0.4% to 2.0%. The Acryloid AT–50 may be varied from 0.02% to 10% with the preferred range being 0.2% to 1%.

(2) The coated film of Example 1 was overcoated with a lacquer comprising acrylic and cellulose ether polymers by a dip method and dried for 2 minutes at 100° C. Adhesion of the lacquer to the first coating and the first coating to the base was excellent when tested with pressure-sensitive adhesive tape.

(3) Example 2 was repeated with monochloroacetic acid in place of the trichloroacetic acid. Adhesion was good.

(4) Polyethylene terephthalate film was subbed as in Example 1 and then coated with a hydrosol of gelatin in water. Adhesion was again tested by means of the tape test and found to be excellent compared to an unsubbed sample.

(5) Polyethylene terephthalate film was subbed as in Example 1 and coated with a photosensitive layer comprising acrylic resins as binders, silica pigment for penciltake, photosensitive diazonium compound, color-forming couplers, and ancillary chemicals such as thiourea, boric acid, citric acid, and tartaric acid. Adhesion of the photosensitive coating to the subbed film in both the unexposed and in the fully exposed and developed states was excellent.

(6) Cellulose acetate butyrate film was subbed as in Example 1. The subbed film was then coated with lacquer. Adhesion was excellent compared to the unsubbed film as determined by the tape test.

(7) Example 1 was repeated with trifluoroacetic acid used in place of trichloroacetic acid. Adhesion was excellent.

(8) Th following solution was coated on polyethylene terephthalate film and dried for 2 minutes at 120° C.

| | | |
|---|---|---|
| Xylene | cc | 95 |
| Acryloid AT–50 | cc | 1 |
| Acryloid B–44 | cc | 4 |
| Benzophenone | gm | 10 |

Adhesion was excellent.

The coated film was then overcoated with a pencil lacquer comprising acrylic resin, melamine formaldehyde resin, and finely dispersed silica pigment. Adhesion was excellent.

(9) A gelatin stock solution was prepared according to the following formula:

| | | |
|---|---|---|
| Water | cc | 10 |
| Gelatin | g | 5 |
| Glacial acetic acid | cc | 100 |

The gelatin stock solution was used to prepare the following coating solution:

Gelatin stock solution _____ cc__ 30
Denatured alcohol such as Solox _____ cc__ 70
Trichloroacetic acid _____ g__ 5

The coating solution was overcoated on a polyester film previously coated with acrylic resin. Adhesion was excellent.

(10) The following subbing solution was prepared:

Methylene chloride _____ cc__ 100
Trichloroacetic acid _____ cc__ 50
Cellulose acetate resin _____ g__ 5

The solution was coated on polyethylene terephthalate film and dried for 5 minutes at 110° C. The subbed film was then overcoated with a 5% solution of cellulose acetate resin in acetone. Adhesion was excellent.

(11) Polyethylene terephthalate film was coated with the following solution.

Polyvinyl butyral _____ gm__ 1
Benzyl alcohol _____ cc__ 100
Methyl ethyl ketone: denatured alcohol (2:1) ___cc__ 20
Trichloroacetic acid _____ gm__ 12

Adhesion was excellent. Polyvinyl formal also gave excellent results.

(12) Polyethylene terephthalate film was coated with the following solution:

Toluene _____ cc__ 95
Acrylic resin (Acryloid B-44) _____ cc__ 4
Trichloroacetic acid _____ gm__ 10

After drying, adhesion was excellent.

Alkyd resin and melamine formaldehyde resin were used in place of the acrylic resin with excellent results.

It is apparent from the described examples that the present invention is capable of many variations and modifications. All such variations and modifications are to be included within the scope of the present invention.

What is claimed is:
1. A coating receptive support material comprising: a polyethylene terephthalate film; and a layer coated on a surface of said film comprising the dried residue of a composition consisting essentially of a mixture, in a common solvent, of a synthetic polymeric binder resin and an adhesion agent selected from the group consisting of trichloroacetic, monochloroacetic, trifluoroacetic acids, benzyl alcohol and benzophenone in an amount sufficient to improve adherence of the binder to the film.

2. Material according to claim 1 wherein said polymeric resin is selected from the group consisting of acrylic, polyvinyl butyral, polyvinyl formal, polyvinyl chloride, melamine-formaldehyde resin, and alkyd resins.

3. A coating receptive support material comprising: a polyethylene terephthalate film; and a layer coating a surface of said film and adherent thereto comprising the dried residue of a composition consisting essentially of a mixture of 5 to 10 parts trichloroacetic acid, 1 to 5 parts of an acrylic/methacrylic acid ester polymer, and 1 to 5 parts of a thermosetting acrylic polymer, in a solvent therefor.

References Cited

UNITED STATES PATENTS

| | | | |
|---|---|---|---|
| 2,341,877 | 2/1944 | Middleton et al. | 96—87 |
| 2,484,529 | 10/1949 | Roedel | 204—162 |
| 2,642,408 | 6/1953 | Stanin et al. | 260—3.6 |
| 2,762,788 | 9/1956 | Siggel et al. | 260—75 |
| 2,776,219 | 1/1957 | Hoyt et al. | 106—128 |
| 2,893,896 | 7/1959 | Beeber et al. | 117—118 |
| 2,976,168 | 3/1961 | Thompson et al. | 117—34 |
| 3,062,674 | 11/1962 | Houck et al. | 117—34 |
| 3,143,421 | 8/1964 | Nadeau et al. | 96—87 |
| 3,169,867 | 2/1965 | Brandt | 96—87 |

WILLIAM D. MARTIN, *Primary Examiner.*

R. HUSACK, *Assistant Examiner.*